March 11, 1924.
E. C. WOOD
ANTISKID TIRE SHOE
Filed Nov. 14, 1922
1,486,716
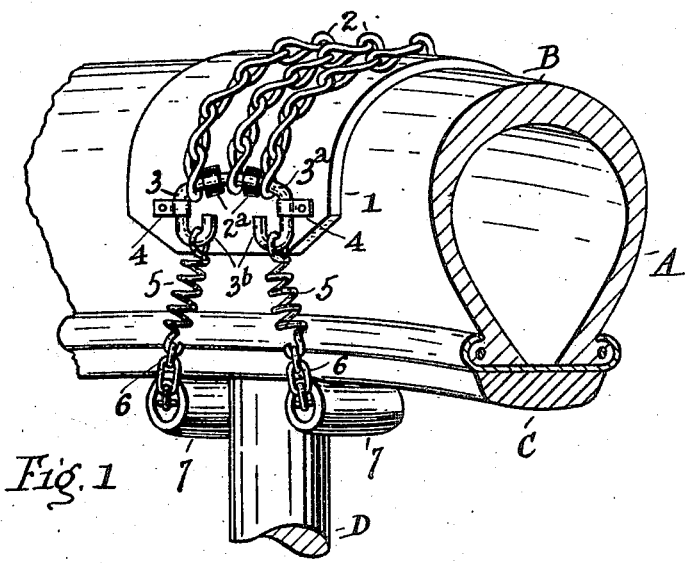
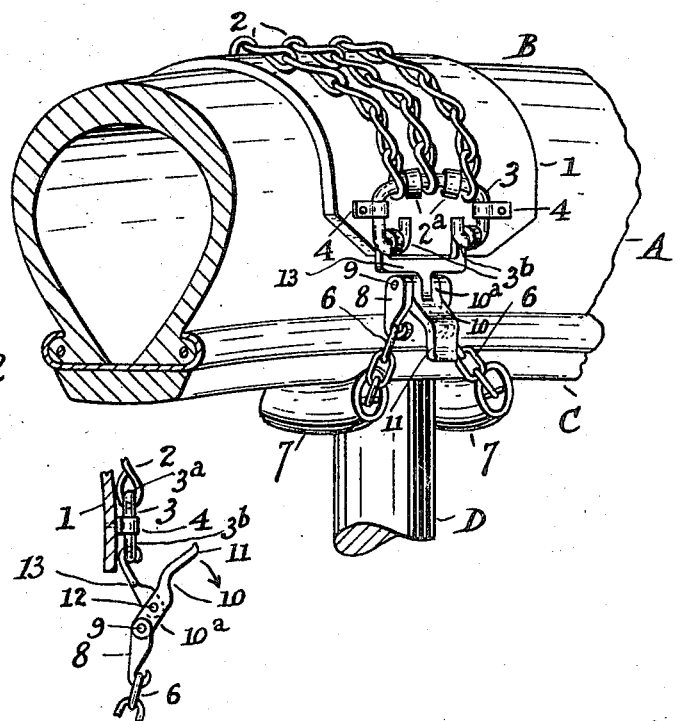
Edward Charles Wood
INVENTOR;
By Otto Wunk
his Attorney.

Patented Mar. 11, 1924.

1,486,716

UNITED STATES PATENT OFFICE.

EDWARD CHARLES WOOD, OF NYAH WEST, VIA SWAN HILL, VICTORIA, AUSTRALIA.

ANTISKID TIRE SHOE.

Application filed November 14, 1922. Serial No. 600,842.

*To all whom it may concern:*

Be it known that I, EDWARD CHARLES WOOD, a subject of the King of Great Britain and Ireland, residing at Nyah West, via Swan Hill, in the State of Victoria, Commonwealth of Australia, have invented certain new and useful Improvements in Antiskid Tire Shoes; and I do hereby declare the following to be a full, clear, and exact description of the invention, such as will enable others skilled in the art to which it appertains to make and use the same.

My invention relates to anti-skid tire shoes for the wheels of motor cars or other motor driven vehicles.

Anti-skid shoes of the generally well known construction are either of the chain mail type, which readily become mud caked, a condition which destroys the efficiency of the shoe and retards the speed of the car, and which is difficult to remove from the wheel, or of the single chain type which are not effective. Other types, such as the chainless saddle type prevent punctures, but if disposed loosely enough to scrape along the tread, cut the tires and, like studded straps, do not prevent skidding. In operation it is found to be objectionable to allow the whole of shoe movement to be thrown against one side of a wheel spoke, and further a steel or like saddle is unsuitable for general service.

With the above objections in mind it is the purpose of the present invention to provide a shoe which is efficient in operation, easily attached to a wheel, and which is inexpensive to manufacture. I accomplish this purpose by means of an apparatus hereinafter fully described, and which comprises a plurality of short transverse metal chains which form road grips. Series of shoes of this character are attached to each wheel and embrace the tire, preferably four shoes being arranged about each wheel to prevent skidding.

A further object of the invention is to arrange the parts of the shoe so that they have between them an anchoring portion of the wheel, i. e. a spoke.

In addition to the objects of the invention pointed out above, the shoe is arranged so that it will be subjected to maximum compression each time it bears on the road, but it will still be held firmly in position by tension of springs provided for the purpose.

In the drawings herewith Figure 1 is a perspective view showing my shoe on a tire.

Figure 2 shows the opposite side of Figure 1.

Figure 3 is an end view of part of Figure 2, with a lever relaxed.

Minor additions, omissions, and modifications may be made as to the construction illustrated, while retaining matter hereinafter claimed.

In the drawings, A represents a wheel tire, B its tread, C the wheel felly, and D a spoke. Each shoe has a saddle, 1, resting on tread B, and made of durable indentable flexible material, as leather, rubberized leather, rubber, or the like. This saddle is a cushion for the group of tread chains, 2, which bear upon and indent it, besides bearing on the road. The saddle protects tread B from being damaged by chains 2. The links of the chains may vary in pattern so as to have more or less grip on the road and on the saddle.

Secured to the saddle at each side is a stirrup 3 to an arcuate or curved part $3^a$ of which are connected tread chain ends, with when desired between the chain ends separators, shown as washers $2^a$. Clips 4 are attached to the saddle in any suitable manner as by bolts and nuts or by rivets, and secure stirrups 3 on the saddle. The stirrups ends have hooks $3^b$, and the hooks $3^b$ at opposite sides of the shoe are connected under tension. Thus I connect to the hooks at one side, spiral springs 5 which tend to contract, and which extend from chains 6. At their middle parts these chains pass through sheaths 7 of cushioning but durable flexible material, such as rubber hose. These sheaths bear on and extend round the wheel felly C, at each side of an anchoring part of the wheel shown as a spoke D, and not only protect both the spoke and the felly from the injury which chain friction would cause, they also enable chains 6 to be without difficulty drawn tight or to be relaxed, as may be desired. The springs secure great tightness when aided by the lever hereinafter described. My shoe cannot creep or be slid circumferentially of the wheel, because a spoke D is between its sheaths.

Connecting the other ends of chains 6 to a transverse axle 9 are links 8. On that axle is pivoted an end $10^a$ (shown forked) of a locking lever 10, having a handle 11. This lever is in locked position in Figure 2, and in unlocked position in Figure 3. Its fork carries an axle 12, on which is pivoted the stem of a link 13 which is shown with a fork having ends to engage the hooks 3ᵇ. By swinging lever 10 on pivot 12, the relative positions of axles 9 and 12 are altered, so that the shoe will be tightened on the tire, or relaxed as the case may be.

The washers 2ᵃ allow each chain 2 to have a full individual anti-skid effect, particularly as the bends 3ᵃ enable each chain 2 to move a slight distance circumferentially during travel, and allow the middle chain to be looser than the side chains. The shoe can be removed by separating suitable members such as springs 5 from hooks 3ᵇ at one side, or the link 13 from hooks 3ᵇ at the other side.

I claim:—

1. An anti-skid shoe for wheel tires, comprising a flexible saddle disposed over the tire, chains disposed over said saddle and adapted to tread on the road, stirrups connected to the chains and to the saddle, and spring fitted means connected to the stirrups on opposite sides of the shoe whereby the latter will embrace the tire.

2. An anti-skid shoe, as claimed in claim 1, in which the said stirrups are mounted in clips on the opposite sides of said saddle, and spacing members embracing the stirrups between the ends of the saddle chains.

In witness whereof I have hereunto set my hand.

EDWARD CHARLES WOOD.

Witness:
G. G. TURRI.